United States Patent [19]

Nakagawa

[11] Patent Number: 4,983,148
[45] Date of Patent: Jan. 8, 1991

[54] MECHANICAL COMPONENT CONSISTING OF ANTI-STATIC MATERIAL

[75] Inventor: Asaharu Nakagawa, Yokkaichi, Japan

[73] Assignee: Kitagawa Industries Co., Ltd., Aichi, Japan

[21] Appl. No.: 444,691

[22] Filed: Dec. 1, 1989

[30] Foreign Application Priority Data

Dec. 12, 1988 [JP] Japan ................... 63-314461

[51] Int. Cl.⁵ .................... F16G 1/08; H01B 1/06
[52] U.S. Cl. ..................... 474/263; 252/511; 474/90
[58] Field of Search .............. 474/90, 263; 361/212, 361/214, 217, 220, 221; 252/500, 502, 510, 511; 428/222, 244, 903

[56] References Cited

U.S. PATENT DOCUMENTS

| | | | |
|---|---|---|---|
| 2,318,441 | 5/1943 | Walton et al. | 474/90 |
| 3,406,126 | 10/1968 | Litant | 252/502 |
| 4,559,164 | 12/1985 | Kostelnik et al. | 252/511 |
| 4,579,902 | 4/1986 | O'Brien | 524/496 |
| 4,752,415 | 6/1988 | Iwaskow et al. | 252/511 |
| 4,810,419 | 3/1989 | Kunimoto et al. | 252/511 |
| 4,823,942 | 4/1989 | Martin et al. | 198/847 |
| 4,832,870 | 5/1989 | Clough et al. | 252/511 |

FOREIGN PATENT DOCUMENTS

| | | |
|---|---|---|
| 0094773 | 11/1983 | European Pat. Off. |
| 0184444 | 6/1986 | European Pat. Off. |
| 0233729 | 8/1987 | European Pat. Off. |
| 0284300 | 11/1989 | European Pat. Off. |
| 61-12753 | 1/1986 | Japan ................... 252/511 |
| 1166253 | 10/1969 | United Kingdom |
| 1336128 | 11/1973 | United Kingdom |
| 1357378 | 6/1974 | United Kingdom |
| 1432216 | 4/1976 | United Kingdom |
| 2063889 | 6/1981 | United Kingdom |

Primary Examiner—Thuy M. Bui
Attorney, Agent, or Firm—Oliff & Berridge

[57] ABSTRACT

A mechanical component consisting of anti-static material is a compound material of synthetic resin and uniformly dispersed carbon fiber as a conductive filler. The carbon fiber is whisker-shaped and is made of hydrocarbon by means of vapor-phase system where hyperfine particles of high-melting metal and/or its compound is utilized as nuclei. The carbon fiber bestows the mechanical component with superior mechanical properties and uniforms and optimum electric resistivity.

17 Claims, 1 Drawing Sheet

MECHANICAL COMPONENT CONSISTING OF ANTI-STATIC MATERIAL

BACKGROUND OF THE INVENTION

This invention relates to a mechanical component consisting of anti-static material used for equipment, such as a copying machine, a facsimile machine, and an electrostatic plotter, which make copies or draw charts by means of static electricity, laser, or the like.

Since equipment such as a copying machine use electrostatic absorption, some mechanical components of the equipment that are made of synthetic resin require static-prevention measures. Other mechanical components including gears and pulleys do not have to be given such measures, because they are generally made of conductive metals.

Mechanical components, such as a drive belt and a driven belt including a V-belt and a timing belt, a roller and a flat belt for feeding paper, and a light carriages of a copying machine, need some elasticity and they are made of synthetic resin such as silicon rubber, hard rubber, or the like. Yet, since these synthetic resin mechanical components are insulating materials, they become charged with static electricity caused by friction. In order to prevent static electricity, these mechanical components contain conductive filler such as carbon black and metallic particles. However, these mechanical components endowed with conductivity by conductive filler have the following problems.

Mixing carbon black in a synthetic resin base material reduces the electric resistivity of the synthetic resin. However, at the same time the mechanical properties including strength of the synthetic resin are lowered. Therefore, only a limited amount of carbon black can be contained in the synthetic resin.

In addition, even if the synthetic resin includes the limited amount of the carbon black, other problems still remain. When the electric resistivity is between $10^{10}$ ohm.cm and $10^3$ ohm.cm, which is the optimum resistivity range for preventing static electricity (called "optimum electric resistivity" below), the resistivity suddenly becomes low by adding a very small quantity of the carbon black. So it is difficult to mix the carbon black in the synthetic resin so as to attain an optimum electric resistivity. As a result when copying paper that has electrostatically adsorbed toner is fed by a paper-feed roller of a copying machine, either static electricity on the paper-feed roller strips the toner from the paper or the paper sticks to the paper-feed roller.

Alternatively, when metallic particles are mixed in synthetic resin, the metallic particles are apt to be randomly, or non-uniformly, dispersed because the specific gravity of the metallic particles is different from that of the synthetic resin. Therefore, mechanical components including metallic particles as a conductive filler have inconsistent electric resistivity.

SUMMARY OF THE INVENTION

It is an object of this invention to solve the above-mentioned problems and to provide a mechanical component consisting of anti-static material with uniform and optimum electric resistivity without damaging the mechanical properties of the synthetic resin base material.

This object is achieved by this invention, which provides a mechanical component including conductive filler mixed in synthetic resin. The carbon fiber, as conductive filler, is made of hydrocarbon by means of vapor-phase system where the hydrocarbon is pyrolyzed, and has hyperfine powder of high-melting metal and/or its compound as nuclei.

DESCRIPTION OF THE PREFERRED EMBODIMENTS

Figure 1:
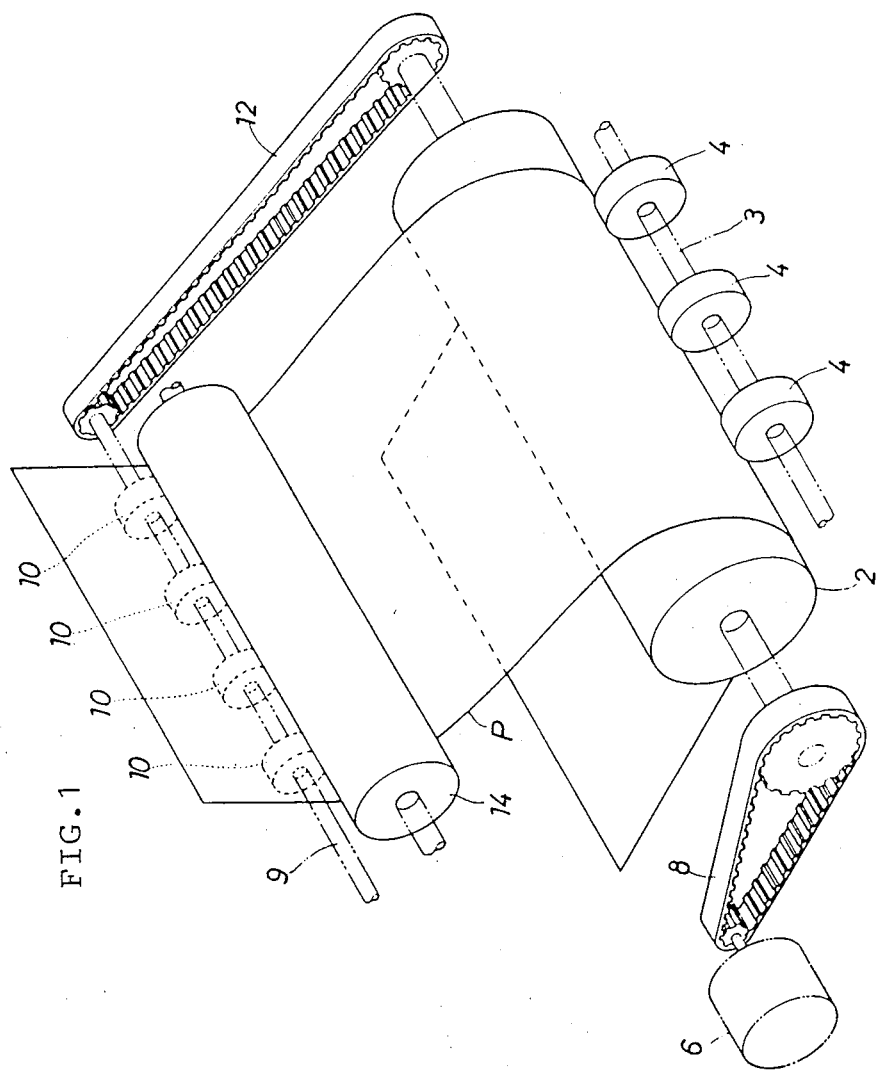
FIG. 1 is an illustration of mechanical components embodying this invention.

A mechanical component of this invention consists of anti-static compound material of synthetic resin and carbon fiber. Unlike polyacrylonitrile carbon fiber and pitch carbon fiber, the present carbon fiber has a shape like a whisker, a small diameter, and a superior affinity for polymeric materials compared with other conductive fillers. Therefore, the carbon fiber is dispersed and kept throughout the synthetic resin base material. In addition, the carbon fiber has desirable mechanical properties such as high tensile strength. The carbon fiber endows the mechanical component with high conductivity and also improves the mechanical properties of the components. The degree of conductivity or electric resistivity depends upon the content of the carbon fiber. Consequently, an appropriate amount of the carbon fiber is contained in each mechanical component according to its purpose.

Metals used for nuclei of the carbon fiber of this invention must not be vaporized between 950° C. and 1300° C., where hydrocarbon is pyrolyzed. Preferable metals are Ti and Zr in IVB group; V, Nb and Ta in VB group, Cr and Mo in VIB group; Mn in VIIB group; and Fe, Co and Ni in VIII group. Fe, Co, Ni, V, Nb, Ta, Ti, and Zr are most preferable. Compounds of these metals are their oxides, nitrides, and salts.

The following is an explanation of an embodiment where the mechanical components of this invention are used as a unit of paper-feed mechanism such as a copying machine and a facsimile machine.

FIG. 1 is an illustration of paper-feeding mechanism including paper-feed cylinders 2 and 14, auxiliary paper-feed rollers 4 and 10, a first belt 8, and a second belt 12.

The paper-feed cylinder 2 is located opposite to the several ring-shaped auxiliary paper-feed rollers 4 on a shaft 3. The first belt 8 transmitting rotation of a motor 6 rotates the first paper-feed cylinder 2. A paper P is carried along the periphery of the first paper-feed cylinder 2. The first paper-feed cylinder 2 moves a second belt 12 and the second belt 12 rotates the several ring-shaped auxiliary paper-feed rollers 10 via a shaft 9. Consequently, the paper P is carried upward between the auxiliary paper-feed rollers 10 and the second paper-feed cylinder 14.

The first paper-feed cylinder 2, the auxiliary paper-feed rollers 4 and 10, and the second paper-feed cylinder 14 are made of silicon rubber containing 8% by volume of carbon fiber, as described below. Siloxane polymer with comparatively high degree of polymerization is appropriately crosslinked in the silicon rubber and the silicon rubber is formed into a cylinder or a ring.

The carbon fiber is generated from nuclei of iron powder in a furnace between 950° C. and 1300° C. where benzene is pyrolyzed. The grain diameter of the iron powder is between 0.02 micron and 0.03 micron. The carbon fiber has a grain diameter between 0.1 micron and 0.5 micron and a length between 0.1 mm and 1 mm. The carbon fiber is bestowed with the following properties:

carbon fiber can be easily endowed with the optimum electric resistivity by regulating the amount of the carton fiber contained therein.

TABLE

| SAMPLE | CONTENT *1 (VOLUME %) | TEARING STRENGTH (Kg/cm) | TENSILE STRENGTH (Kg/cm$^2$) | EXTENSION (%) | VOLUME RESISTIVITY (ohm · cm) |
|---|---|---|---|---|---|
| ROLLER OF THIS EMBODIMENT | 8 | 32 | 145 | 325 | $1 \times 10^5$ |
| ROLLER OF PRIOR ART | 0 | 30 | 150 | 350 | $6 \times 10^{14}$ |
| BELT OF THIS EMBODIMENT | 10 | 26 | 60 | 200 | $5 \times 10^5$ |

*1 CONTENT OF CARBON FIBER OR CARBON BLACK
*2 BASE MATERIAL: NEOPRENE

Tensile strength: 200 Kg/cm$^2$
Modulus of elasticity: 20 t/mm$^2$
Resistivity: 0.001 ohm.cm The carbon fiber has a specific gravity of 1.86, and also has superior affinity for a variety of synthetic rubbers including silicon rubber compared with metallic fillers or carbon powder. Since the first paper-feed cylinder 2, the auxiliary paper-feed rollers 10, the auxiliary paper-feed rollers 4, and the second paper-feed cylinder 14 are made of silicon rubber with uniformly dispersed carbon fiber, these cylinders 2 and 14 and rollers 4 and 10 have uniform electric resistivity of $1 \times 10^5$ ohm.cm. The surfaces of these cylinders and rollers with low and uniform resistivity can effectively and reliably prevent static electricity.

Consequently, the paper P is free from problems caused by static electricity, such as sticking to the first paper-feed cylinder 2 or the like. Further, an electrostatic latent image formed on the paper P by a not-shown charged body or a not-shown photosensitive drum is not damaged while the paper P is fed. Moreover, toner adsorbed on the electrostatic latent image on the paper P by static electricity is not detached from the paper P. In brief, the paper-feed cylinders 2 and 14 and the paper-feed rollers 4 and 10 prevent the copying quality from deteriorating.

The first belt 8 and the second belt 12, which rotate the first paper-feed cylinder 2 and the auxiliary paper-feed rollers 10 respectively, are used as timing belts and contain neoprene rubber as main components. Like the paper-feed cylinders 2 and 14 and the auxiliary paper-feed rollers 4 and 10, the neoprene rubber contains 5% by volume of carbon fiber. Therefore, these timing belts can prevent static electricity as effectively as the cylinders and the rollers.

Furthermore, as seen in the below table, the first paper-feed cylinder 2, the second paper-feed cylinder 14, the auxiliary paper-feed rollers 5 and 10, the first belt 8, and the second belt 12 are endowed with mechanical properties superior to prior-art components with carbon black mixed in. These cylinders, rollers, and especially belts to which a fixed tension is consistently given, have more prominent durability.

Since the frequency of linkage of carbon black particles is not proportional to the amount of the carbon black particles, it is difficult to produce synthetic resin material containing carbon black with the optimum electric resistivity. On the contrary, the frequency of linkage of carbon fiber is almost proportional to the amount of the carbon fiber because each carbon fiber is equivalent to some quantity of carbon black particles. The synthetic resin containing carbon fiber can acquire a fixed electric resistivity. Thus, the synthetic resin with An experiment was conducted using test pieces of the configuration designated as tension test piece no. 3 of the Japanese Industrial Standard, that is having a dumbbell-shape with end sections 40 mm long and 25 mm wide with an arc-like taper (radius 25 mm) from each edge to a center section 20 mm long, 5 mm wide and 3 mm or less thick, having an organization identical to that of the first paper-feed cylinder 2, the second paper-feed cylinder 14, the auxiliary paper-feed rollers 4 and 10, the first belt 8, and the second belt 12. The test pieces were measured by means of a constant-speed tensile testing machine at the tensile speed of 500 mm/min in a temperature controlled room of 20° C. The experiment shows that the optimum content of carbon fiber is between 3% by volume and 40% by volume, and more preferably it is between 5% by volume and 30% by volume.

It should be understood that the mechanical component consisting anti-static material of this invention is not limited to the above-mentioned embodiment. The component can be applied to a light carriage for a copying machine, V-belt, or the like. In addition, although the carbon fiber is dispersed throughout the silicon rubber base material of the components in this embodiment, the carbon fiber can be alternatively dispersed on the outer surface of the components.

What is claimed is:

1. A mechanical component that is resistant to static electricity, comprising a body, said body formed from an elastic synthetic resin, said synthetic resin having carbon fibers formed on a metallic core uniformly dispersed throughout said synthetic resin such that said body has an electrical resistance in the range of $10^3$ to $10^{10}$ ohm.cm.

2. The mechanical component of claim 1, wherein the carbon fibers are substantially between 0.1 and 0.5 microns in diameter and substantially between 0.1 and 1.0 millimeters in length.

3. A mechanical component as claimed in claim 2, wherein said metallic core comprises a grain having a diameter substantially between 0.02 and 0.03 microns.

4. A mechanical component as claimed in claim 3, wherein said carbon fiber is most preferably formed by pyrolyzing benzene in a furnace at a temperature between 950° C. and 1300° C. in the presence of said grains for forming said metallic cores.

5. The mechanical component of claim 1, wherein substantially between 5% and 30% by volume of carbon fibers are contained in the body of the component.

6. The mechanical component of claim 1, where the body of the mechanical component is formed into a roller.

7. The mechanical component of claim 1, where the body of the mechanical component is formed into a belt.

8. The mechanical component of claim 1, wherein the carbon fibers are dispersed throughout the synthetic resin such that a lattice-like network of carbon fibers is formed, where the network of carbon fibers provides conductivity to the body of the component without substantially degrading the physical properties of the synthetic resin.

9. The mechanical component of claim 1, wherein substantially between 3% and 40% by volume of carbon fibers are contained in the body of the component.

10. A mechanical component as claimed in claim 1, wherein said metallic core is a metal from the group comprising titanium, zirconium, vanadium, niobium, chromium, molybdenum, manganese, iron, cobalt, nickel, and tantalum.

11. A mechanical component as claimed in claim 10, wherein said metal is most preferably from the group comprising iron, cobalt, nickel, vanadium, niobium, tantalum, titanium and zirconium.

12. A mechanical component as claimed in claim 10, wherein said metallic core may be of a form from the group comprising a pure metal, an oxide, a nitride, and a salt, said form having a vaporization temperature greater than 1300° C.

13. A mechanical component that is resistant to static electricity, comprising a body, said body is formed from an elastic synthetic resin and having carbon fibers uniformly dispersed on a surface of said body, said carbon fibers having a metallic core element.

14. The mechanical component of claim 13, wherein the carbon fibers are substantially between 0.1 and 0.5 microns in diameter and substantially between 0.1 and 1.0 millimeters in length.

15. The mechanical component of claim 13, wherein the carbon fibers are dispersed on the surface of the body of the component such that a lattice-like network of carbon fibers is formed on the surface of the body, where the network of carbon fibers provides conductivity to the surface of the body of the component without substantially degrading the physical properties of the synthetic resin.

16. The mechanical component of claim 13, where the body of the mechanical component is formed into a roller.

17. The mechanical component of claim 13, where the body of the mechanical component is formed into a belt.

* * * * *